United States Patent
Ivanovic et al.

(10) Patent No.: US 10,848,772 B2
(45) Date of Patent: Nov. 24, 2020

(54) HISTOGRAM-BASED EDGE/TEXT DETECTION

(71) Applicant: ATI Technologies ULC, Markham (CA)

(72) Inventors: Boris Ivanovic, Markham (CA); Mehdi Saeedi, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/146,198

(22) Filed: Sep. 28, 2018

(65) Prior Publication Data

US 2020/0107032 A1    Apr. 2, 2020

(51) Int. Cl.
| | | |
|---|---|---|
| H04N 19/00 | (2014.01) |
| H04N 19/196 | (2014.01) |
| G06T 7/44 | (2017.01) |
| H04N 19/176 | (2014.01) |
| H04N 19/119 | (2014.01) |
| H04N 19/124 | (2014.01) |

(52) U.S. Cl.
CPC ........... *H04N 19/196* (2014.11); *G06T 7/44* (2017.01); *H04N 19/119* (2014.11); *H04N 19/124* (2014.11); *H04N 19/176* (2014.11)

(58) Field of Classification Search
CPC .. H04N 19/196; H04N 19/119; H04N 19/124; H04N 19/176; G06T 7/44
See application file for complete search history.

(56) References Cited

U.S. PATENT DOCUMENTS

| | | | |
|---|---|---|---|
| 2003/0053708 A1* | 3/2003 | Kryukov | H04N 19/86 382/261 |
| 2003/0059110 A1* | 3/2003 | Wilt | G06T 5/40 382/168 |
| 2006/0274833 A1 | 12/2006 | Kojokaro et al. | |
| 2010/0080459 A1* | 4/2010 | Dai | G06T 5/009 382/170 |
| 2011/0026582 A1* | 2/2011 | Bauza | G06T 3/4007 375/240.02 |
| 2013/0094771 A1* | 4/2013 | Chaudhuri | G06K 9/00751 382/224 |
| 2013/0121573 A1* | 5/2013 | Shen | G06K 9/00456 382/166 |
| 2014/0289423 A1 | 9/2014 | Kim et al. | |
| 2015/0010233 A1* | 1/2015 | Barman | G06K 9/36 382/167 |
| 2015/0125090 A1* | 5/2015 | Mizobuchi | H04N 5/142 382/266 |
| 2016/0014421 A1 | 1/2016 | Cote et al. | |
| 2017/0201769 A1 | 7/2017 | Chon et al. | |
| 2018/0108327 A1* | 4/2018 | Jung | G09G 5/026 |
| 2018/0330529 A1 | 11/2018 | Maruyama et al. | |
| 2019/0188835 A1* | 6/2019 | Loginov | G06T 5/008 |

OTHER PUBLICATIONS

U.S. Appl. No. 16/176,699, filed Oct. 31, 2018.

* cited by examiner

*Primary Examiner* — Zhihan Zhou
(74) *Attorney, Agent, or Firm* — Volpe Koenig (57) ABSTRACT

Described is a system and method for dynamically changing encode quality at a block level based on runtime pre-encoding analysis of content in a video stream. A video encoder continuously analyzes the content during runtime, and collects statistics and/or characteristics of the content before encoding it. This classifies the block among pre-defined categories of content, where every category has its own compression parameters.

10 Claims, 9 Drawing Sheets

HISTOGRAM-BASED EDGE/TEXT DETECTION

BACKGROUND

Video encoders are typically used to compress video data and reduce the amount of video data transmitted. Rate control is a process that takes place during video encoding to maximize the quality of the encoded video while adhering to a particular bitrate constraint. Parameters such as the Quantization Parameter (QP) are typically changed by the video encoder to adapt to the available bitrate. QP values can be changed at different times such as per frame or per block. Changing QP values has a significant impact on the fidelity and quality of the encoded content since a higher QP means a greater loss of details during the quantization process.

BRIEF DESCRIPTION OF THE DRAWINGS

A more detailed understanding may be had from the following description, given by way of example in conjunction with the accompanying drawings wherein.

DETAILED DESCRIPTION

The present disclosure is directed to a system and method for detecting graphical edges based on analysis of content in a video stream. Frames of video are divided into blocks. A calculator generates a histogram based on the content of each block. An analyzer analyzes the generated histograms to identify the type of content contained in each block. The type indicates one of a high likelihood of hard edges in the block or a low likelihood of hard edges in the block. In sum, the analysis performed based on a generated histogram produces a determined type that indicates whether a block is likely to contain hard edges (such as those that are present when computer text is a part of the block) or is not likely to contain hard edges (as is the situation where "natural video" containing little or no computer graphics or text within the block).

The determined type is subsequently used for any of a variety of purposes. In one example, the above technique is incorporated into a video encoder. A pre-processing analyzer analyzes the video and classifies each block according to one of the above types. The encoder encodes blocks that are classified as likely to contain hard edges with more bits than blocks that are classified as not likely to contain hard edges. Affording more bits to blocks likely to have hard edges allocates bits to those blocks whose discernibility would suffer with a lower number of bits. In some examples, the bits are allocated away from other blocks for which the discernibility is less affected by that loss of bits. As a result, a better visual experience for a viewer is achieved in encoded video.

A variety of techniques for generating a classification based on a histogram are provided herein. Examples of these techniques include taking a discrete time derivate of the histogram and comparing the histograms to database of known content types.

Figure 1A:
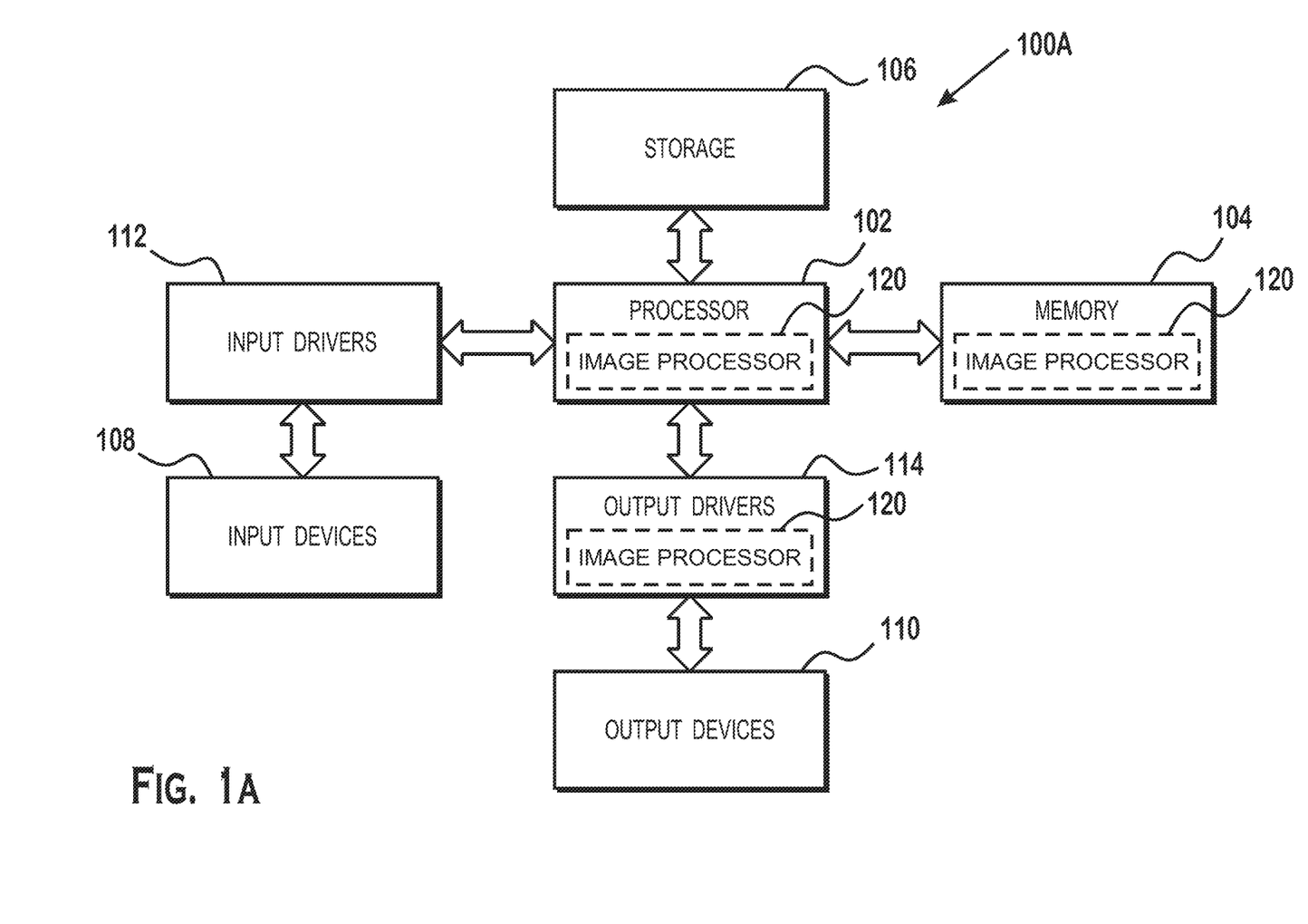
FIG. 1A is a block diagram of an example device in which one or more disclosed implementations may be implemented.

FIG. 1A is a block diagram of an example device 100A in which one or more aspects of the present disclosure are implemented. The device 100A includes, for example, a computer (such as a server, desktop, or laptop computer), a gaming device, a handheld device, a set-top box, a television, a mobile phone, or a tablet computer. The device 100A includes a processor 102, a memory 104, a storage device 106, one or more input devices 108, and one or more output devices 110. The device 100A optionally includes an input driver 112 and an output driver 114. It is understood that the device 100A optionally includes additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 is located on the same die as the processor 102 or separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a camera, keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108 and permits the processor 102 to receive input from the input devices 108. The output driver 114 communicates with the processor 102 and the output devices 110 and permits the processor 102 to send output to the output devices 110.

An image processor 120 is shown in two different forms. The image processor 120 obtains images, processes the images, and outputs image processor output. In a first form, the image processor 120 is software that is stored in the memory 104 and that executes on the processor 102 as shown. In a second form, the image processor is at least a portion of a hardware graphics engine that resides in output drivers 114. In other forms, the image processor 120 is a combination of software and hardware elements, with the hardware residing, for example, in output drivers 114, and the software executed on, for example, the processor 102. The image processor 120 analyzes images stored in memory, such as in memory 104, or any other memory such as a buffer stored in or associated with a hardware implementation of the image processor 120, or any other memory. In various examples, the image processor 120 analyzes sequences of images output by a graphics processor (such as a three-dimensional graphics processing pipeline), or sequences of images stored, for example, as a movie in memory 104, storage device 106, or some other location.

Figure 1B:
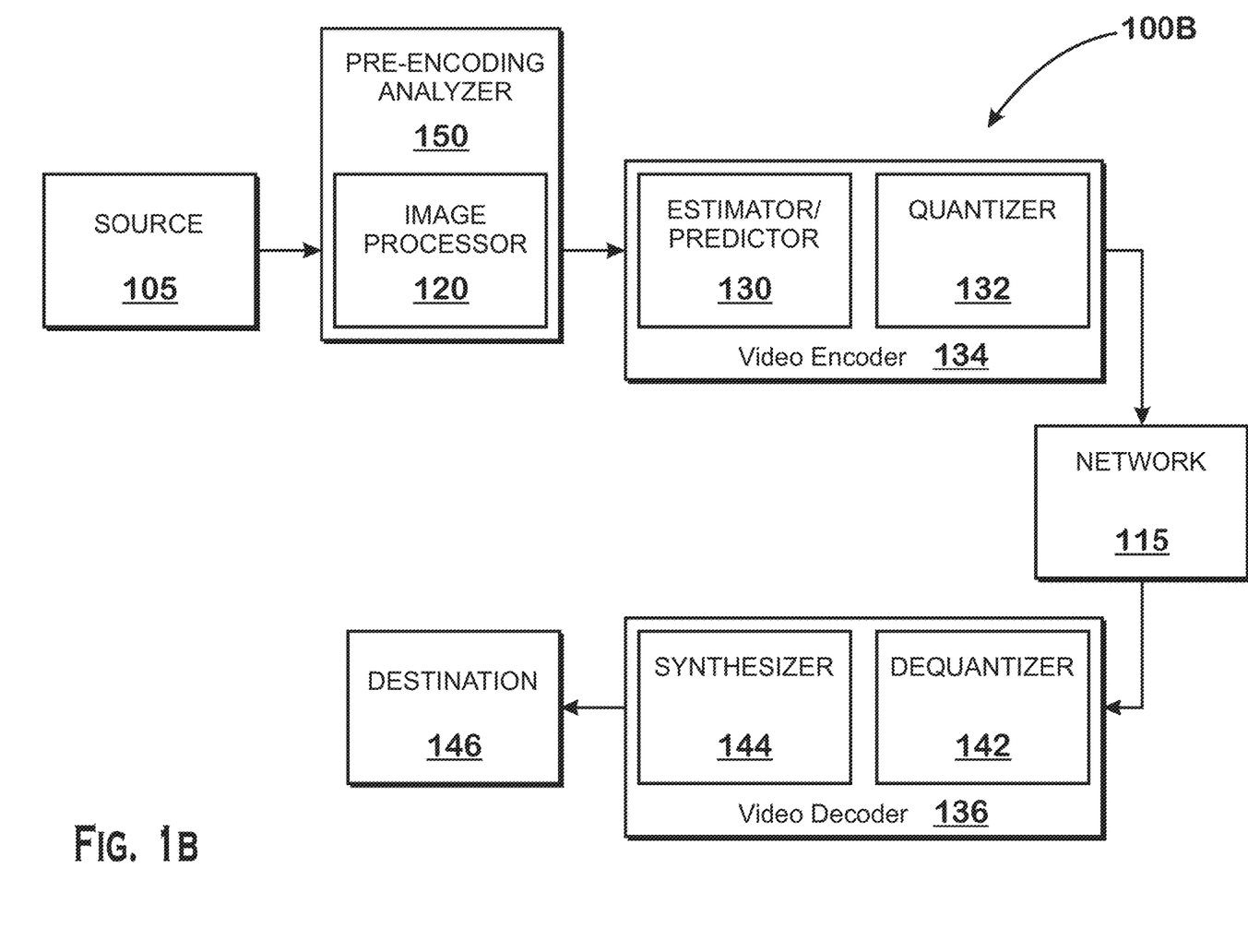
FIG. 1B is a high-level block diagram of a system that uses an image processor in accordance with certain implementations.

FIG. 1B is a high-level block diagram of a system 100B for sending encoded video data or video streams over a network 115 from a source 105 to a destination side 146 in accordance with certain implementations. In this example system 100B, the image processor 120 is included within the pre-encoding analyzer 150 and analyzes images received from the source 105 to inform the video encoder 134 with regards to the manner in which images are to be encoded.

The source 105 includes any device capable of storing, capturing or generating video data that is transmitted to the destination side 146, or any memory buffer included within or associated with the source. The device can be, but is not limited to, a mobile phone, an online gaming device, a camera or a multimedia server. The video stream from these devices feeds video encoder 134, which in turn encodes the video stream as described herein. The encoded video stream is processed by the video decoder 136, which in turn sends the decoded video stream to destination devices, which can be, but are not limited to, an online gaming device and a display monitor.

The video encoder 134 includes, but is not limited to, an estimator/predictor 130 and a quantizer 132. The video decoder 136 includes, but is not limited to, a dequantizer 142 and a synthesizer 144.

In general, video encoding decreases the number of bits required to encode a sequence of rendered video frames by eliminating redundant image information and by reducing entropy. For example, closely adjacent video frames in a sequence of video frames are usually very similar and often only differ in that one or more objects in the scenes they depict move slightly between the sequential frames. The estimator/predictor 130 is configured to exploit this temporal redundancy between video frames by searching a reference video frame for a block of pixels that closely matches a block of pixels in a current video frame to be encoded. The same concept can be used to search for spatial redundancy in the same frame.

Figure 4:
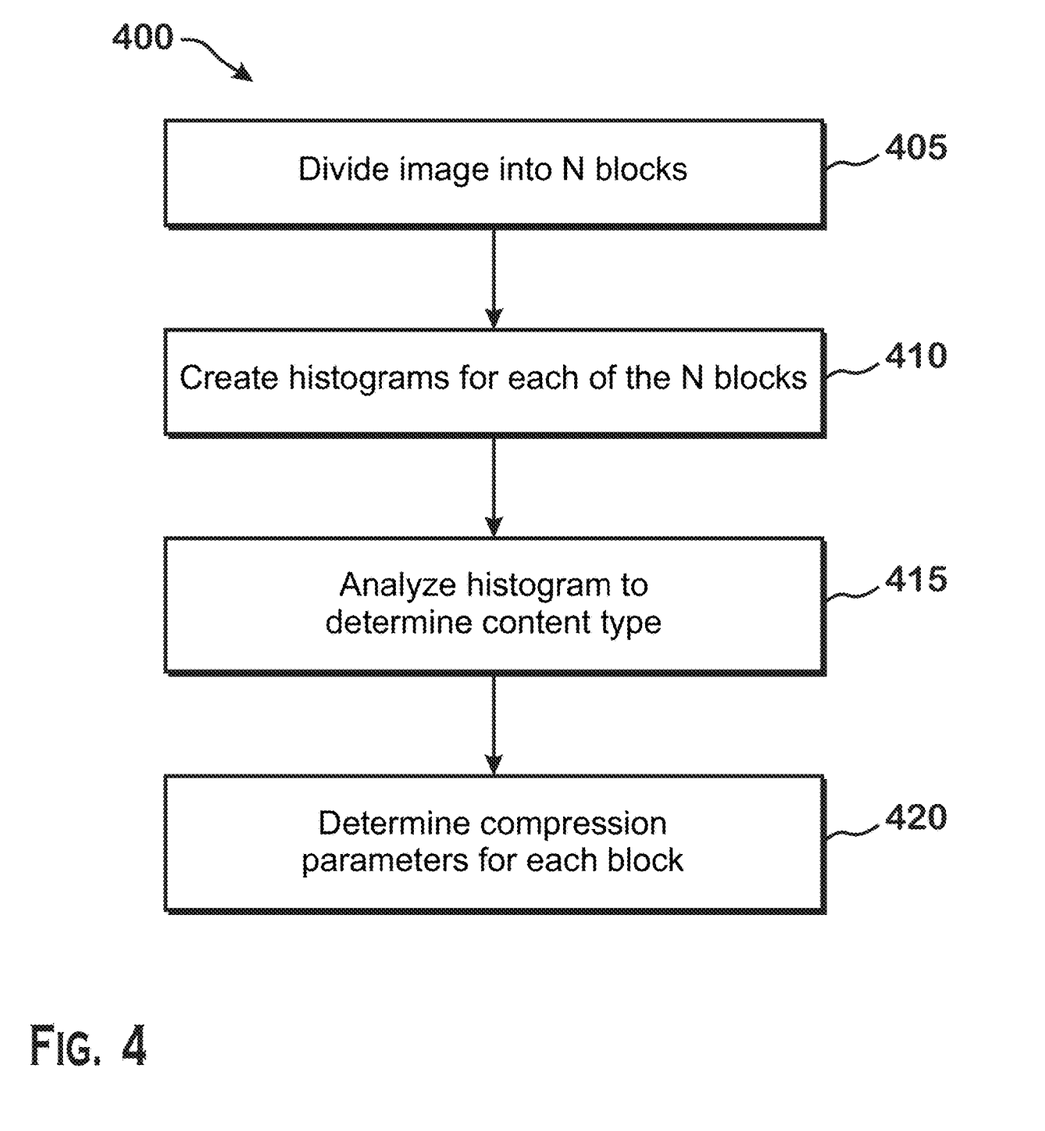
FIG. 4 is an example flow diagram of a technique for dynamically determining compression parameters.

The video encoder 134 implements rate control by implementing the selected compression parameters received from the pre-encoding analyzer 150, which includes the image processor 120, which functions according to method 400. In an implementation, the pre-encoding analyzer 150 is integrated with the video encoder 134. In an alternative implementation, the pre-encoding analyzer 150 is a standalone device.

The quantizer 132 uses the compression parameters to adapt to the varying content and/or available bitrate. The dequantizer 142 processes the decompressed video stream and the synthesizer 144 reconstructs the video stream before transmitting it to the destination 146.

Figure 2:
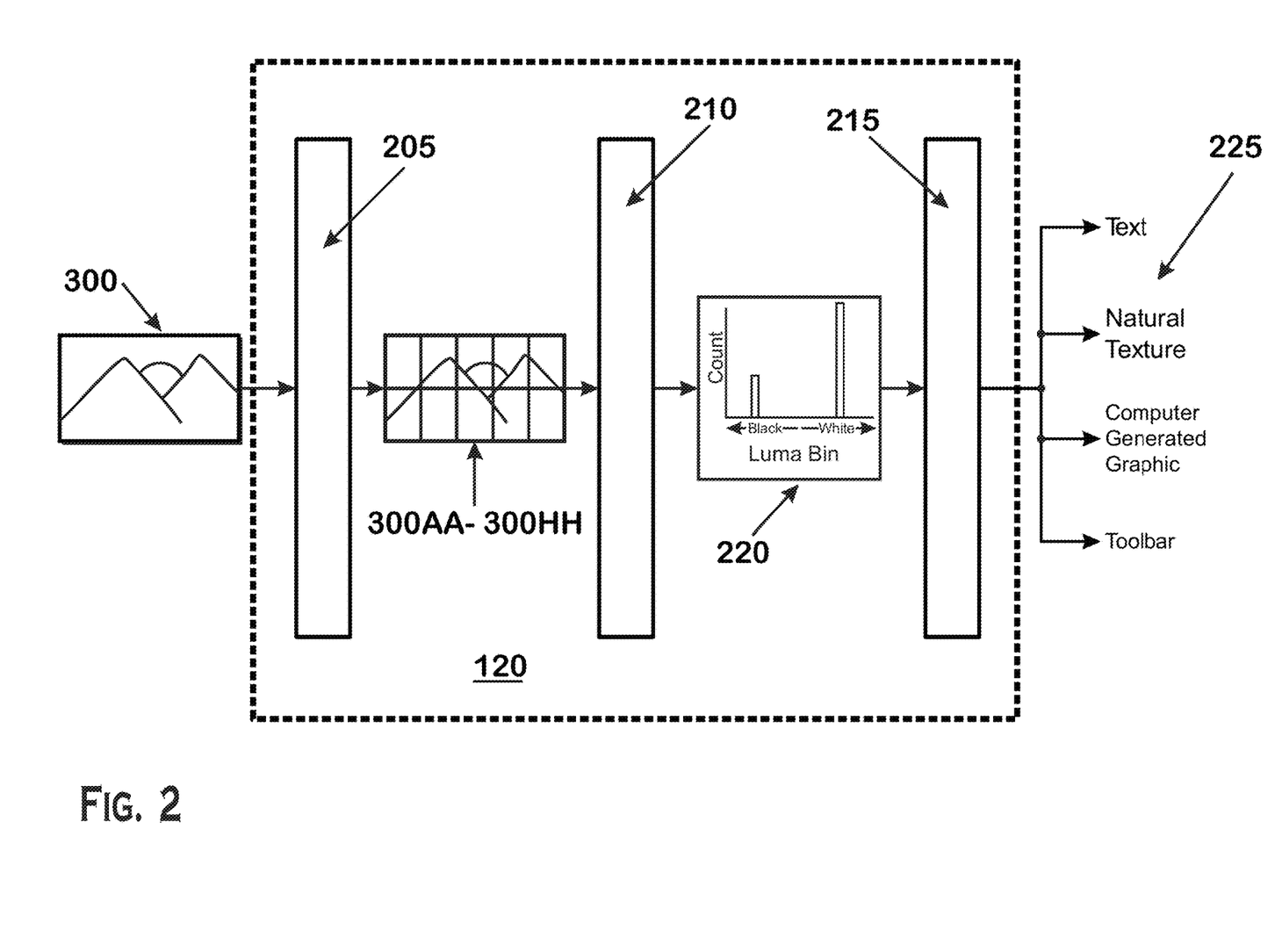
FIG. 2 is an illustration of an image processor in accordance with certain implementations.

FIG. 2 is an illustration of the image processor 120. The image processor 120 receives an image 300 from the source 105. The divider 205 then divides the image 300 into a plurality of blocks 300AA-300HH. In some implementations, the blocks 300AA-30011H are macroblocks or "coding tree units" as defined in The H.265 standard developed by the Motion Picture Experts Group (MPEG). The blocks 300AA-30011H are then received by the calculator 210. The calculator 210 generates histograms 220 for the blocks 300AA-300HH. Histogram data can be generated on the illuminance component as depicted in histograms 220 and identified as 'Luma'. Other approaches are also possible depending on the used color space or application preference. In other words, instead of being histograms of luminance, the histograms may be histograms of another value that characterizes the pixels of the blocks 300. The analyzer 215 then receives the histograms 220 and classifies the content contained within each of the blocks 300AA-300HH. The analyzer 215 generates a classification result 225. In some implementations, the classification result 225 includes compression parameters that specify how the video encoder 134 is to encoder video. The classification result 225, in some implementations, is then received by the video encoder 134. Although described as being used to adjust the manner in which video is encoded, in various other implementations, the classification result 225 is used for operations other than encoding video.

Figure 3A:
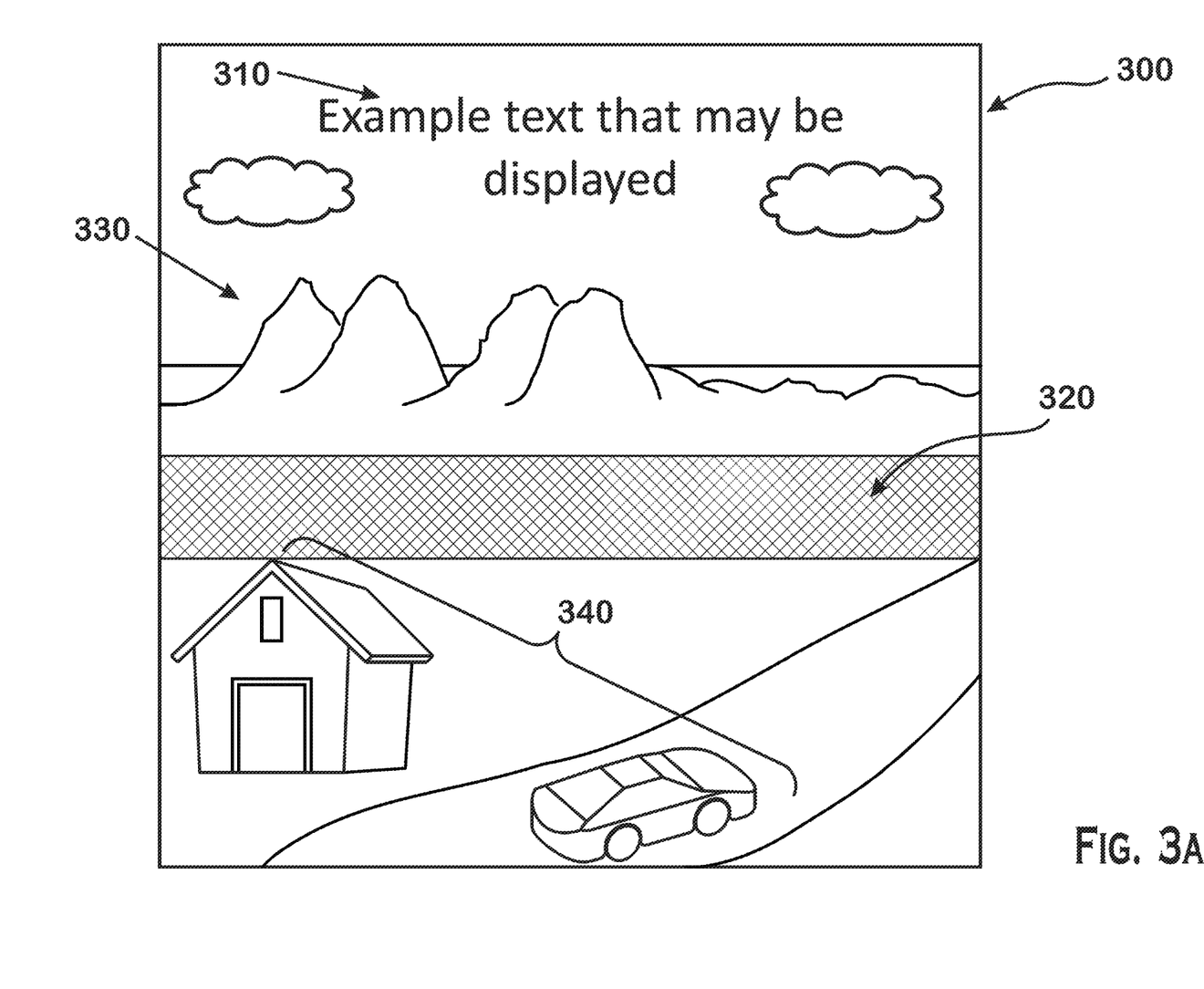
FIG. 3A is an illustration of an image from which blocks can be formed.

FIG. 3A is an illustration of an image from which blocks can be formed and analyzed by the image processor 120, according to an example. The image 300 contains multiple types of content. For instance, image 300 contains text 310, a natural texture 320, a background 330 and foreground content 340.

Some traditional video compression techniques use the same compression parameters on the entire image. In such techniques, the same parameters are typically used for blocks that contain text 310, a natural texture 320, a background 330 and foreground content 340, and these compression parameters are determined based on the total composite of image 300. In an example, the traditional techniques would classify image 300 as a natural scene and utilize low quality compression parameters. Applying the low-quality compression parameters to the text 310 would likely render the text 310 illegible if the text is small, or would cause the text 310 to look unpleasant if the text 310 is relatively large.

Figure 3B:
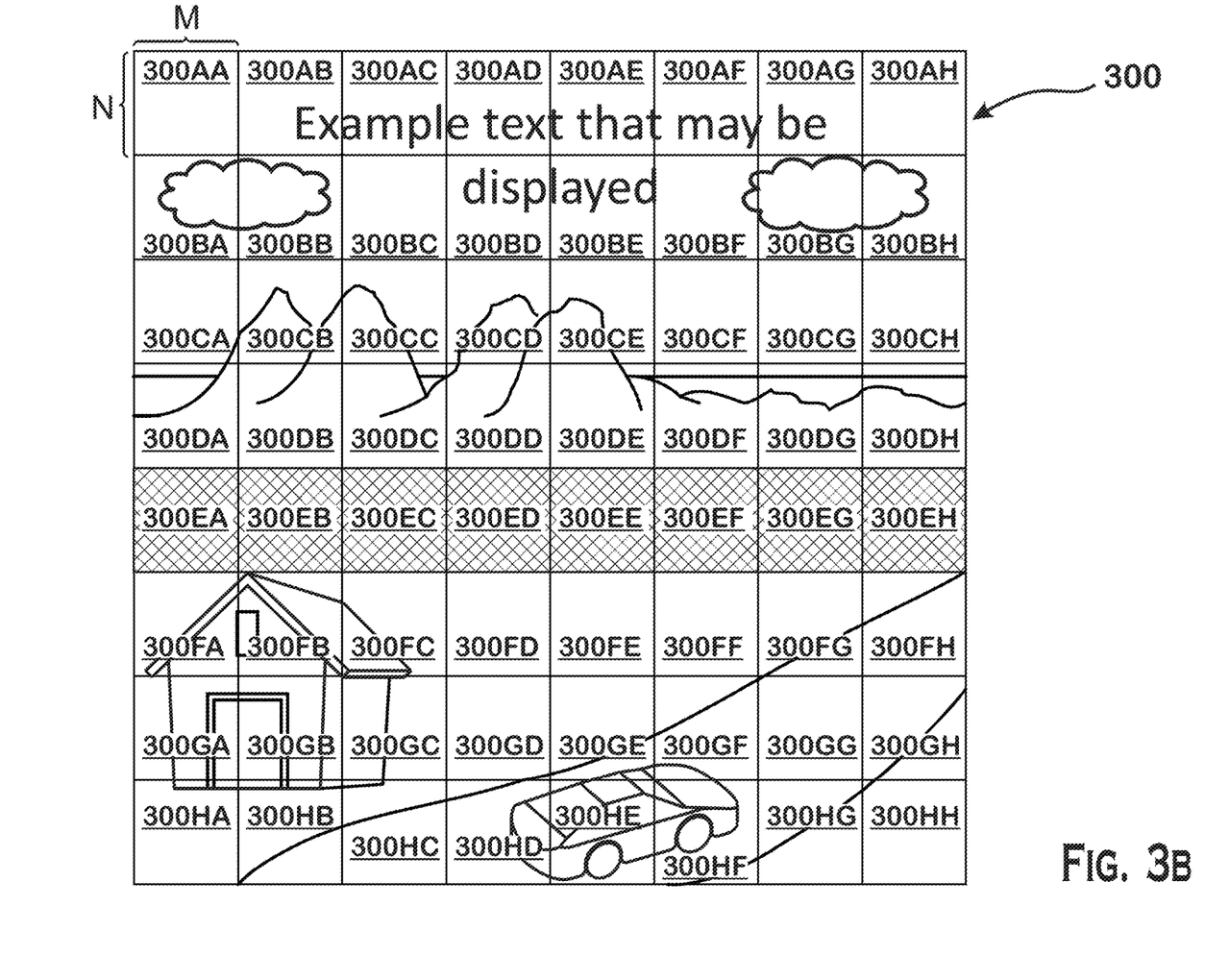
FIG. 3B is an illustration of an image with blocks illustrated.

FIG. 3B shows blocks 300AA-300HH that are formed from image 300. Each block is formed from M×N pixels. In some implementations, the numerical values of M and N are predetermined. For example, each block may be 16×16 pixels. In other implementations, the number of pixels in each block may be set based on a targeted output format. In yet other implementations, the number of pixels contained in each block is determined based on the block size of the encoder 134. For example, some encoder 134 values (such as quantization parameter) can only be changed at a particular granularity which therefore must match the size of the blocks 300. In still other implementations, the number of pixels contained in each block is dynamically adjusted for a second pass of the technique described herein by analyzing the histograms 220 generated by the calculator 210 in a first pass. In an example, if the analyzer 215 determines that all of the histograms contain the same content type, the block size is decreased and a second pass of the classification technique provided herein is performed. In another example, if the analyzer 215 determines that all of the histograms 220 contain different content types, the block size is increased and a second pass of the technique provided herein is performed.

In the example image of FIG. 3B, block 300AC contains text. When encoded using traditional methods the text may be highly distorted and rendered illegible because text requires high quality compression parameters. In the example image of FIG. 3B, block 300EF contains a natural texture. Distortions and compression artifacts in natural texture are less likely to be distracting to the user. Accordingly, low quality compression parameters are appropriate.

Although text and natural textures are discussed, this same technique can be used to analyze images having any content type for which a distinction between hard edges and the lack thereof is useful.

FIG. 4 is a flow diagram of a method 400 for determining compression parameters to be applied to particular blocks, according to an example. In various implementations, the method 400 is performed by the image processor 120. In step 405, the divider 205 divides the image 300 into blocks 300AA-300HH. In some implementations, the number of blocks the divider 205 divides the image 300 into is predetermined or established based on a target output formation (i.e., H.264/AVC). In other implementations, the number of blocks is statically or dynamically determined based on block size of each of blocks 300AA-30011H In step 410, the calculator generates histograms 220 for each of the blocks 300AA-300HH. In some implementations, the histograms are generated based on the pixel luminosities. In these implementations, the histograms 220 plot a pixel luminosity (on the x-axis) versus a count of the number of pixels having that luminosity (on the y-axis). In most implementations, the darkest tones are on the left side of the graph and the brightest tones are on the right side of the graph. In an implementation, the luminosity of each block is determined based on a weighted average of the Red, Green and Blue components of each of the pixels of the block. In other implementations, the luminosities of the block are determined by applying a transformation function. For example, a transformation function to convert the pixel luminosities to gamma/linear response may be utilized.

The process used to bin the histograms 220 for each of the blocks 300AA-300HH is the same for each block 300. The range of values (e.g., luminosities) for each of the bins of for the histograms 220 are in some implementations predetermined. In some instances, predetermined values of the ranges of the bins are determined based on application, preference or available resources. In other instances, the predetermined values of the ranges are empirically determined based on the human visual perception of contrast. For example, each bin may have a width of one or more JNDs (just noticeable difference), where a just noticeable difference is an empirically determined range of luminosities deemed to be perceptible to the human visual system.

Next, in step 415, the analyzer 215 analyzes each of the histograms 220 to determine the type of content contained in each of the blocks 300AA-300HH. In some implementations, the analyzer 215 performs a de-noising pre-analysis step. In some implementations, this de-noising pre-analysis step includes removing all values where the counts of pixels in particular bins are less than a predetermined threshold. In other implementations, the analyzer 215 dynamically determines the threshold based on a statistical variation of the counts of the intensities across all of the bins. In other implementations, this de-noising pre-analysis step the analysis includes subtracting an adjustment value from each of the bin values.

One technique by which the analyzer 215 determines the type of content contained in a block is by calculating a discrete derivative for each of the bins in the histogram. In some implementation, the discrete derivative utilizes a forward or backward difference operator. In addition, in some implementations, to eliminate possible negative values, the discrete derivative is squared. After calculating the discrete derivative for each bin, the discrete derivate of each of the bins is summed. In addition, the values are normalized by a maximum pixel count for the particular block.

An example, algorithm implementing the discrete derivative is shown below:
Step 1: Construct a histogram for each block.
Step 2: Sum all bins: $S=\Sigma_{i=0}^{n-1}(Y_i-Y_{i-1})^2$
Step 3: Optionally normalize. ex.: normalize by max value, which is:
$2*M^2*N^2$, where the block is M×N pixels In step 2 above, the value for each histogram bin is referred to as "Yi," where "i" is the index of the bin. The value for a histogram bin is the number of blocks that fall into that bin. The discrete derivative in the formula is represented by the difference operator, according to which the value of one bin is subtracted from the value of another bin. Specifically, the value for a first histogram bin is subtracted from the value for a second histogram bin that is the immediate neighbor of the first histogram bin. Step 2 also illustrates an optional squaring operation to ensure that magnitude of the difference is recorded, without retaining the sign of the difference. In addition, a square operation also makes larger differences more significant than if no square operation were used. Step 3 is an operational normalization step. The normalization is used to map values to be in a range such as 0 to 1. The goal is to have values that are independent of the block size. This is optional, and may be useful for some applications as well as debugging. Accordingly, the term $2*M^2*N^2$ is used because the value of each bin is counted twice, as it is "looked at" twice by the equation in Step 2.

In an example, the normalized sum of all the bins is compared against several ranges. Each range is associated with a classification result 225. The range that the resulting value falls into dictates the classification result of the content that was analyzed. In an example, values between 0 and 0.025 indicate natural content, noise, or gradients, values between 0.05 and 0.5 indicate text, and values close to 1 indicate a solid color. Although specific ranges and associated classifications are described, it should be understood that the ranges and specific classification types may be selected by based on the application. For example, 1080p video may require different ranges of values than 4K video and 8K video. In some implementations, the ranges are determined by using machine learning on a training set of images of different content types.

A histogram 220 of a macroblock that contains solid colors will demonstrate a maximum normalized summation of the discrete derivatives value because all of the pixels are a single color and therefore counted in a single bin. On the other hand, a histogram 220 of a macroblock that contains natural content, noise or gradients will have low values for the normalized sum of all the bins. The natural content, noise or gradients will have low values because these contents types are likely to have continuous color distributions. Therefore, the gradient between adjacent bins is quite small. Text based content is likely to demonstrate a histogram 220 with two discrete sharp peaks. Accordingly, the normalized sum of all the bins value lies between the two extremes a solid color and natural content. As a result, text content will have values greater than a first threshold and less than a second threshold.

For example, when a block such as 300AC (which contains a 'W') is analyzed, the summation of the discrete derivatives of each of the bins results in a value of between the example range of 0.05-0.5. These values allow the block 300AC to be identified as text.

When a block such as 300BB (which contains a cloud) is analyzed, the summation of the discrete derivations of each of the bins results in a value of between the example range of 0-0.025. These values allow the block 300BB to be identified as containing natural content, noise or gradients.

An analysis of block 300FD (which contains a solid color) results in the summation of the discrete derivations of each of the bins being a value close to 1. This allows block 300FD to be identified as containing a solid color.

Another technique to determine the type of content contained in the block is by the analyzer 215 comparing the histogram 220 to a database of known content types that are stored in the memory 104.

In some implementations, the comparison of the histogram 220 to the database is performed by the analyzer 215 subtracting the histogram 220 from histograms that are associated with a particular content type stored in the memory. When the histogram 220 is subtracted from the database histogram, each individual bin in the histogram 220 is subtracted from a corresponding bin in the database histogram. A sum of the squared differences is then calculated. The content type is then identified by identifying the histogram in the database that has the smallest sum of the squared differences.

In other implementations, the comparison of the histogram 220 to the database is performed by the analyzer 215 performing a Fast Fourier Transformation (FFT) on the histogram and comparing the resulting coefficients to coefficients associated with each of the content types stored in the memory. Although an FFT is identified, a person skilled in the art would appreciate that other transformations are used.

In yet other implementations, the comparison of the histogram generated in step 410 is performed by the analyzer 215 fitting a distribution to the generated histogram. The distribution may be fitted using a parametric technique such as method of moments, maximum spacing estimation method of L-moments, maximum likelihood method, or similar methods known in the art. Alternatively, the distribution may be fitted using a regression method. For example, a Weibull distribution is fitted to the block and the resulting shape, scale and threshold parameters are then compared to those stored in the database and associated with a particular content type.

Optionally, in step 420, the analyzer 215 determines compression parameters for each of the blocks 300AA-300HH based on the type of content identified in step 415. The compression parameters may include a Quantization Parameter (QP) or any other "quality knob" (or named differently than QP) that allows the encoding quality to be changed on each "unit" of pixels that are encoded together. By changing the compression parameters, the amount of processing and transmission bandwidth required can be adjusted. For example, high-quality parameters such as low QP value (e.g., QP value closer to 0) are used for blocks that contain content that is particularly important to the user (i.e., text) or is particularly prone to compression artifacts (i.e., human faces).

Alternatively, low-quality parameters such as high QP value (e.g., QP value closer to 51) are used for blocks that include content that is less important to the user (i.e., natural textures) or less prone to compression artifacts (i.e., solid colors). Once the compression parameters are determined in step 420, the parameters are then utilized by the video encoder 134 to compress the video.

Figure 5A:
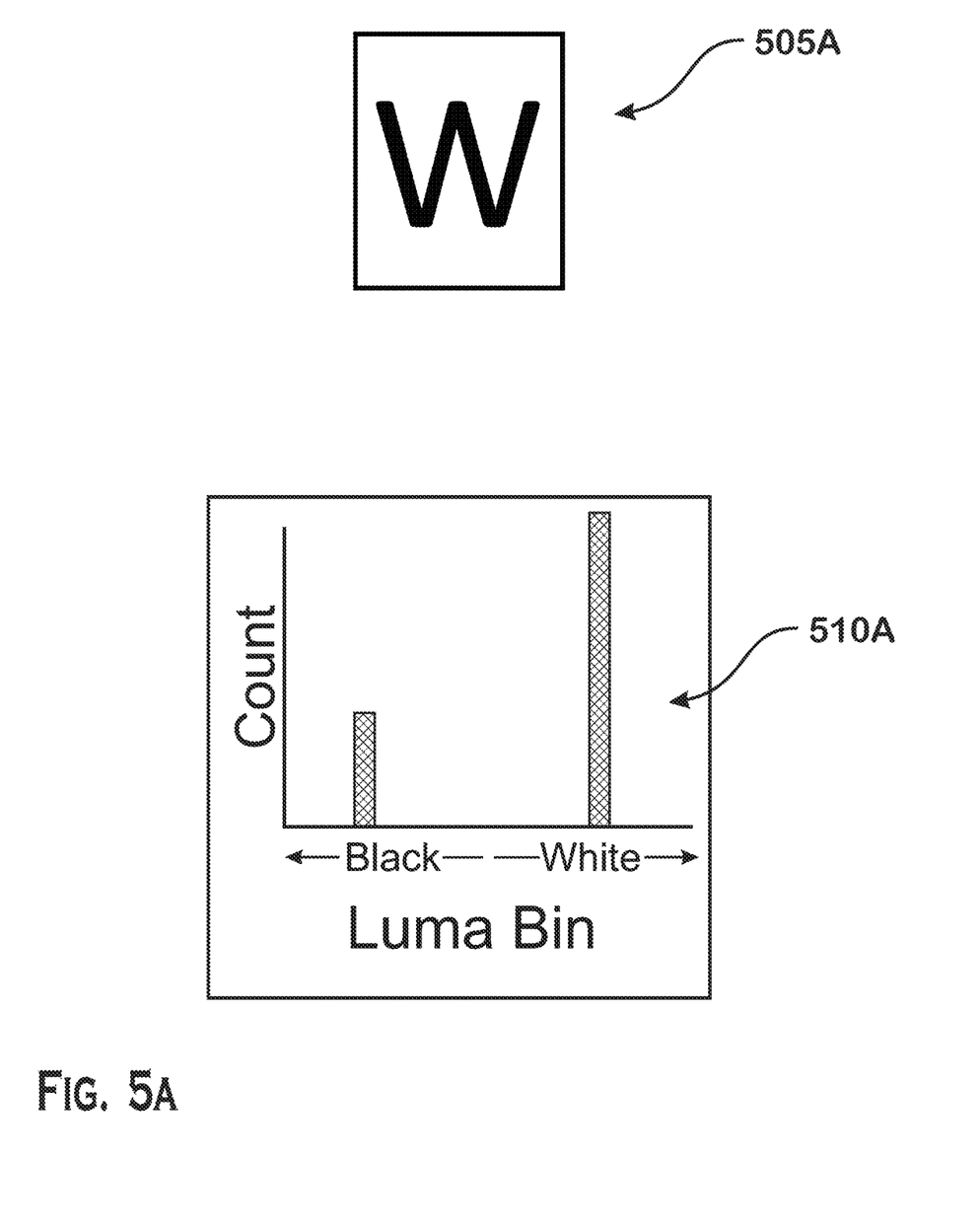
FIGS. 5A-5C depict example images that illustrate example blocks that may be analyzed.

An example of a block 505A containing the letter 'W' is shown in FIG. 5A. An example of a histogram that is generated (step 415) is depicted in histogram 510A. Histogram 510A shows sharp transitions in the intensities. Accordingly, when the histogram 510A is analyzed in step 415, the image processor 120 recognizes that block 505A contains text.

Figure 5B:
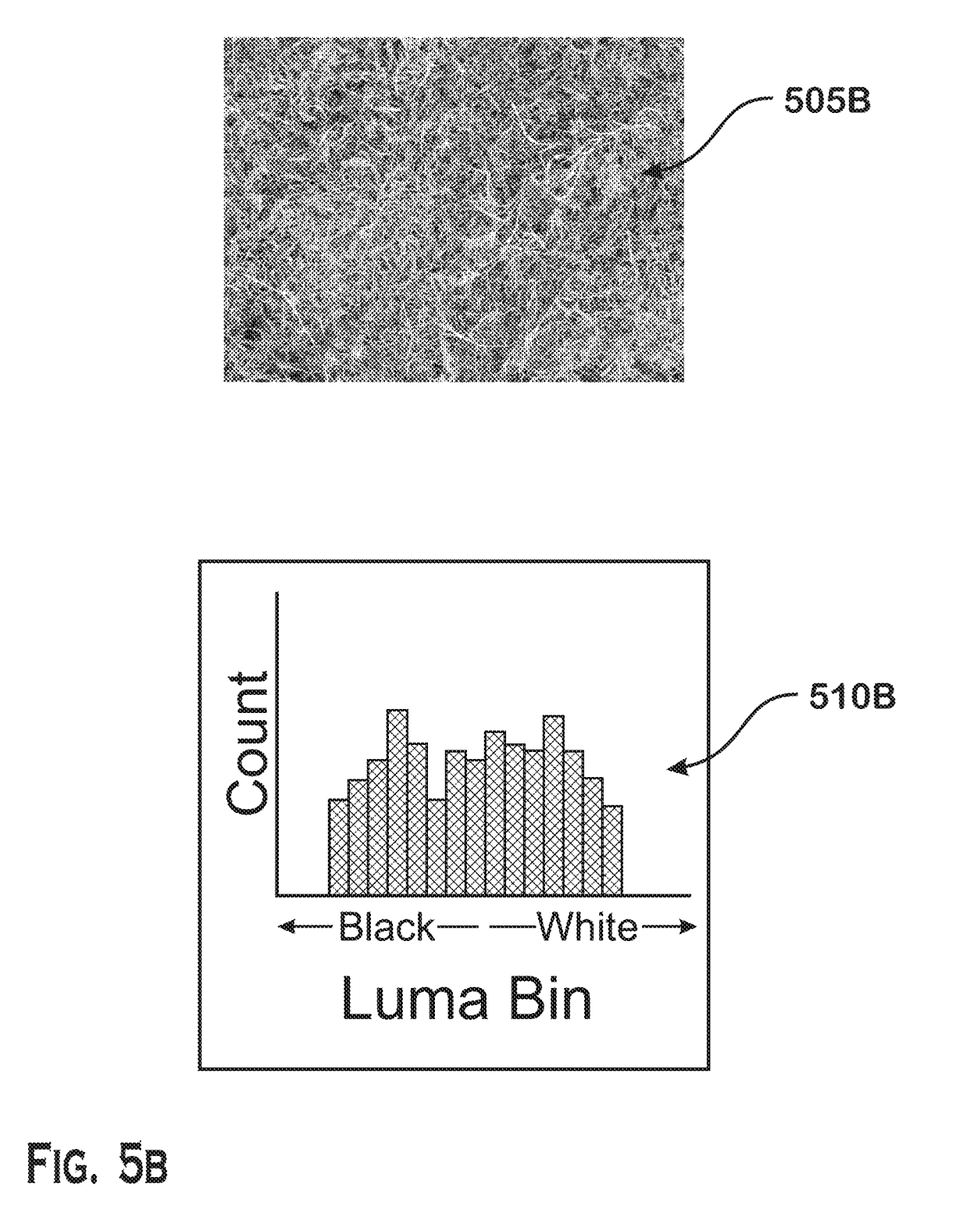

FIG. 5B shows an example of a block that is analyzed. Specifically, block 505B is of a texture. The image processor 120 generates histogram 510B for block 505B. Histogram 510B shows a large dispersion of intensities and does not include sharp transitions. Accordingly, when analyzed in step 415, the image processor 120 classifies block 505B as not containing text. In addition, in some implementations, the image processor 120 classifies the block 505B as containing a texture.

Figure 5C:
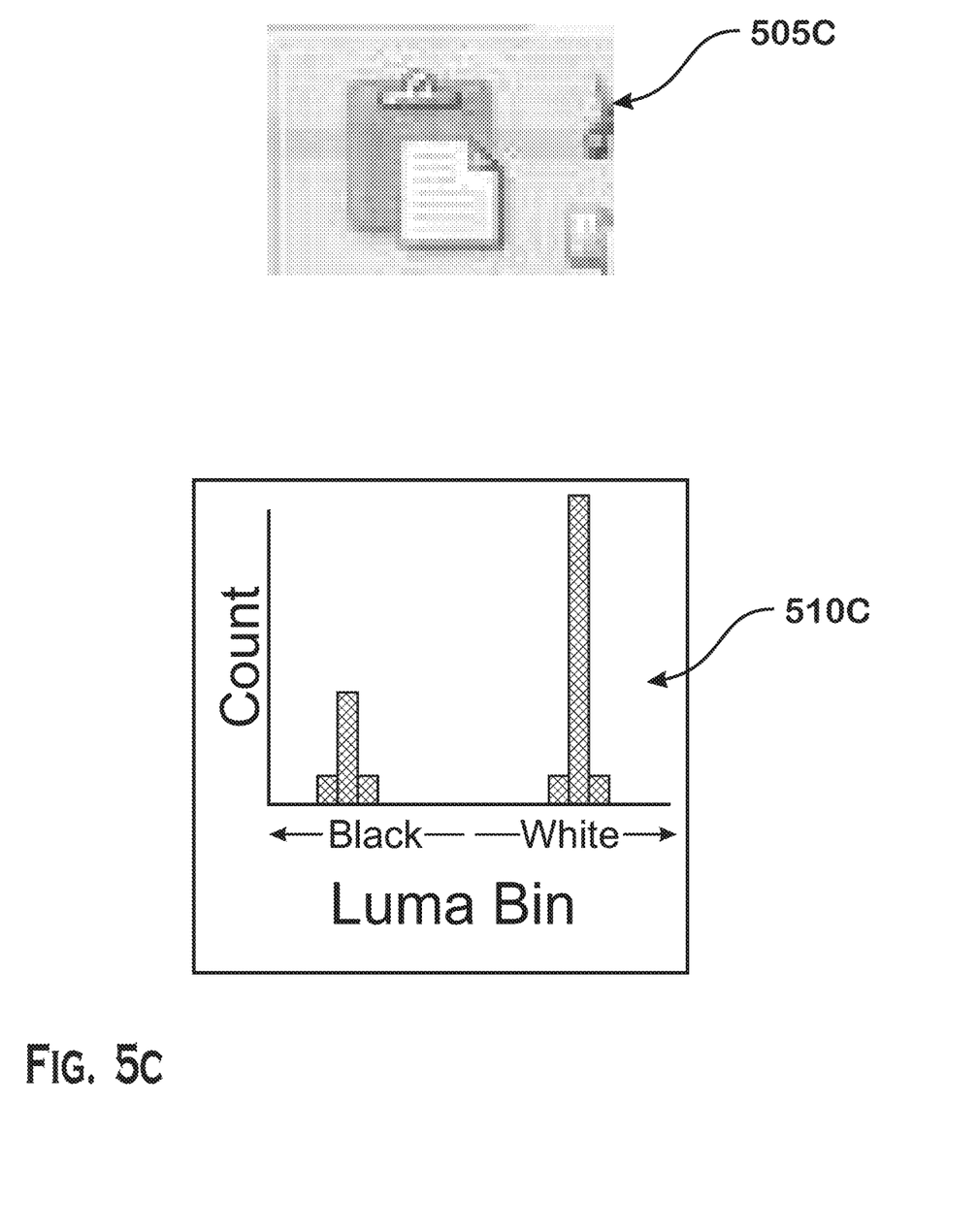

FIG. 5C shows another example of a block that is analyzed. Specifically, block 505C is part of a toolbar of a word processing program. The image processor 120 generates histogram 510C for block 505C. The histogram 510C shows a wider dispersion of intensities than in 510A and less than shown in 510B. As a result, when analyzed in step 415, the image processor 120 determines block 505C as not containing text. In addition, in some implementations, the image processor 120 classifies block 505C as containing a toolbar.

Although a texture and a toolbar are depicted in FIGS. 5B and 5C, the same technique can be extended to any type of content that is contained in a block.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read-only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for dynamically encoding an image, the method comprising:
   receiving a frame of a video stream;
   dividing the frame into a plurality of blocks;
   forming a respective histogram for each of the plurality of blocks, wherein each histogram includes a plurality of bins indicating a count of pixel intensities; and
   determining a respective content type for the respective histogram of each of the plurality of blocks, wherein, for one block of the plurality of blocks, the determining comprises:
   obtaining a discrete derivative-based value for each bin of the block;
   summing the discrete derivative-based values to obtain a discrete derivative sum value; and
   determining a content type for the block by comparing the derivative sum value to a plurality of content-associated ranges and selecting a content type associated with a content-associated range that the discrete derivative sum value falls within.

2. The method of claim 1, further comprising:
selecting encoding parameters for each of the plurality of blocks based the respective content type; and
encoding the frame based on the encoding parameters selected.

3. The method of claim 1, wherein the content type for the block is determined to be text in response to the summation exceeding a first threshold and being less than a second threshold.

4. The method of claim 3, wherein the encoding parameter selected for text includes a Quantization Parameters (QP) that is lower than for other content types.

5. An encoding system comprising:
a pre-encoder configured to:
  receive a frame of a video stream,
  divide the frame into a plurality of blocks,
  form a respective histogram for each of the plurality of blocks, wherein each histogram includes a plurality of bins indicating a count of pixel intensities, and
  determine a respective content type for the respective histogram of each of the plurality of blocks, wherein, for one block of the plurality of blocks, the determining comprises:
    obtaining a discrete derivative-based value for each bin of the block;
    summing the discrete derivative-based values to obtain a discrete derivative sum value; and
    determining a content type for the block by comparing the derivative sum value to a plurality of content-associated ranges and selecting a content type associated with a content-associated range that the discrete derivative sum value falls within.

6. The encoding system of claim 5, wherein the pre-encoder is further configured to select encoding parameters for each of the plurality of blocks based the respective content type; and the encoding system further comprises:
an encoder configured to encode the frame based on the encoding parameters selected.

7. The encoding system of claim 5, wherein the content type for the block is determined to be text in response to the summation exceeding a first threshold and being less than a second threshold.

8. The encoding system of claim 7, wherein the encoding parameter selected for text includes a Quantization Parameters (QP) that is lower than for other content types.

9. A non-transitory computer-readable medium storing instructions that, when executed by a processor, cause the processor to dynamically encoding an image:
receiving a frame of a video stream;
dividing the frame into a plurality of blocks;
forming a respective histogram for each of the plurality of blocks, wherein each histogram includes a plurality of bins indicating a count of pixel intensities; and
determining a respective content type for the respective histogram of each of the plurality of blocks, wherein, for one block of the plurality of blocks, the determining comprises:
  obtaining a discrete derivative-based value for each bin of the block;
  summing the discrete derivative-based values to obtain a discrete derivative sum value; and
  determining a content type for the block by comparing the derivative sum value to a plurality of content-associated ranges and selecting a content type associated with a content-associated range that the discrete derivative sum value falls within.

10. The non-transitory computer-readable medium of claim 9, wherein the processor further dynamically encodes the image by:
selecting encoding parameters for each of the plurality of blocks based the respective content type; and
encoding the frame based on the encoding parameters selected.

* * * * *